(12) United States Patent
Kearl

(10) Patent No.: US 6,828,055 B2
(45) Date of Patent: Dec. 7, 2004

(54) BIPOLAR PLATES AND END PLATES FOR FUEL CELLS AND METHODS FOR MAKING THE SAME

(75) Inventor: Daniel A. Kearl, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 09/917,500

(22) Filed: Jul. 27, 2001

(65) Prior Publication Data

US 2003/0022052 A1 Jan. 30, 2003

(51) Int. Cl.⁷ .................................................. H01M 2/14
(52) U.S. Cl. .......................... 429/38; 429/39; 429/34; 429/32; 429/35; 429/36; 429/19
(58) Field of Search ........................... 429/19, 32, 34, 429/35, 36, 38, 39, 40, 44

(56) References Cited

U.S. PATENT DOCUMENTS

| | | | |
|---|---|---|---|
| 4,175,165 A | 11/1979 | Adlhart | 429/30 |
| 4,567,117 A * | 1/1986 | Patel et al. | 429/19 |
| 4,631,239 A | 12/1986 | Spurrier et al. | 429/39 |
| 5,034,288 A * | 7/1991 | Bossel | 429/32 |
| 5,616,431 A | 4/1997 | Kusunoki et al. | 429/36 |
| 5,733,682 A | 3/1998 | Quadakkers et al. | 429/210 |
| 5,773,161 A | 6/1998 | Farooque et al. | 429/34 |
| 5,776,624 A | 7/1998 | Neutzler | 429/26 |
| 5,798,188 A | 8/1998 | Mukohyama et al. | 429/34 |
| 5,935,725 A | 8/1999 | Dhar et al. | 429/12 |
| 5,945,229 A | 8/1999 | Meltser | 429/13 |
| 5,972,530 A | 10/1999 | Shelekhin et al. | 429/26 |
| 6,071,636 A | 6/2000 | Mosdale | 429/34 |
| 6,203,936 B1 | 3/2001 | Cisar et al. | 429/44 |

OTHER PUBLICATIONS

Fuel Cell Systems Explained by Laraminie et al, pp 1–16, Wiley, New York, NY, 2000 *.
Ballard Power Systems, pp 1–2, printed from http://www-.ballard.com on Jun. 12, 2001.
Fuel Cells, pp 1–20, printed from http://www.britannica-.com on Jun. 12, 2001.

* cited by examiner

Primary Examiner—Bruce F. Bell

(57) ABSTRACT

Bipolar plates and end plates for fuel cell stacks. The bipolar plates or end plates may include semi-conductive or conductive bodies, intricate features with close tolerances such as narrow flow channels and conduits with complex flow paths, integral resistive heating elements, internal catalytic reforming capability, integral heat exchanging structure, substantially flat and undistorted contact faces, integral sensors, and internal recuperative heat exchanging capacity.

Methods of making bipolar plates and end plates for fuel cell stacks. The methods involve a range of integrated processing techniques that enable a flexible approach to bipolar and end plate design. In addition, the ability to reliably produce features on a small scale allows for the potential miniaturization of bipolar plates and end plates and is therefore ideally suited to further the development of small scale portable fuel cell systems.

46 Claims, 9 Drawing Sheets

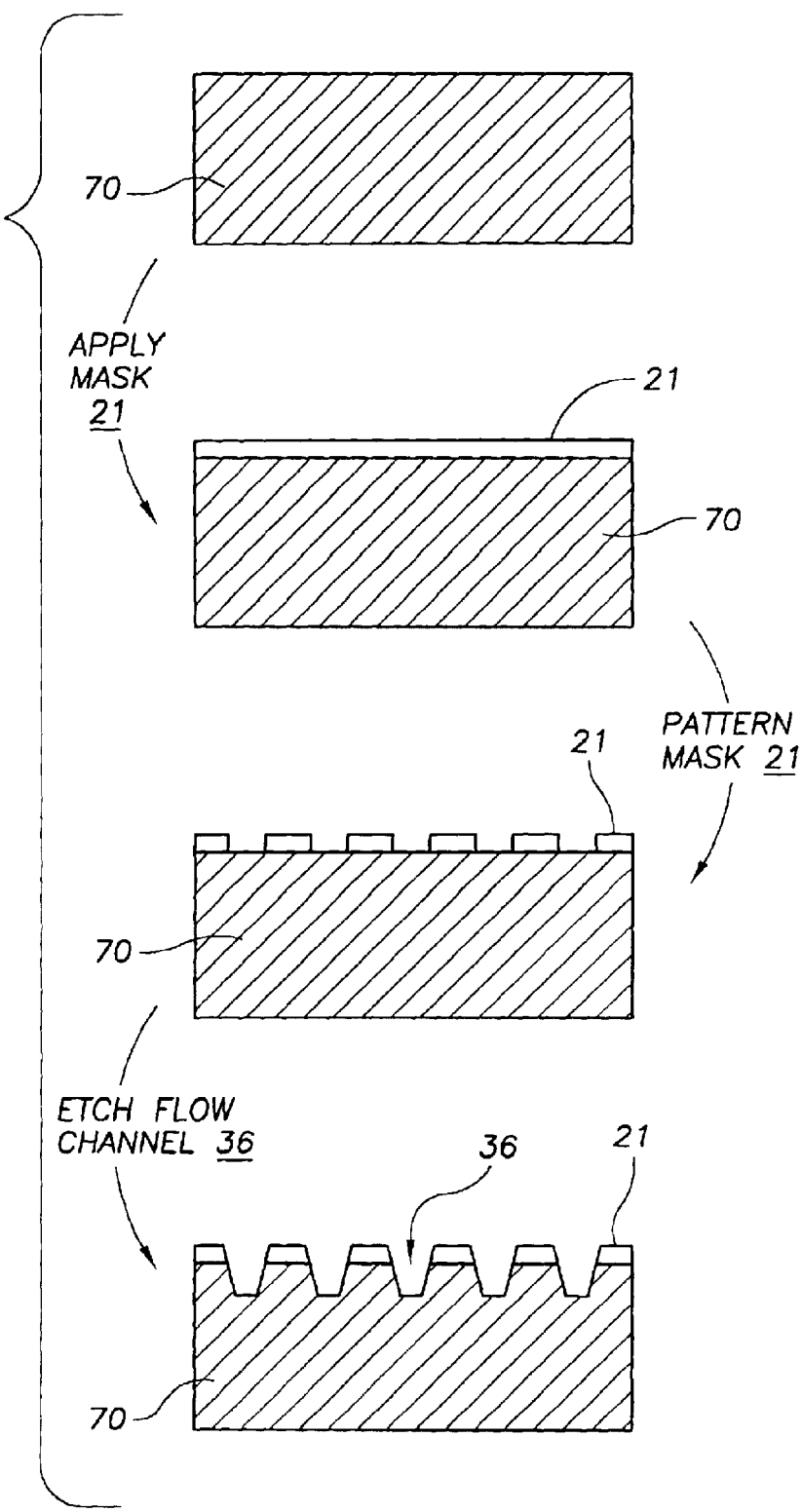

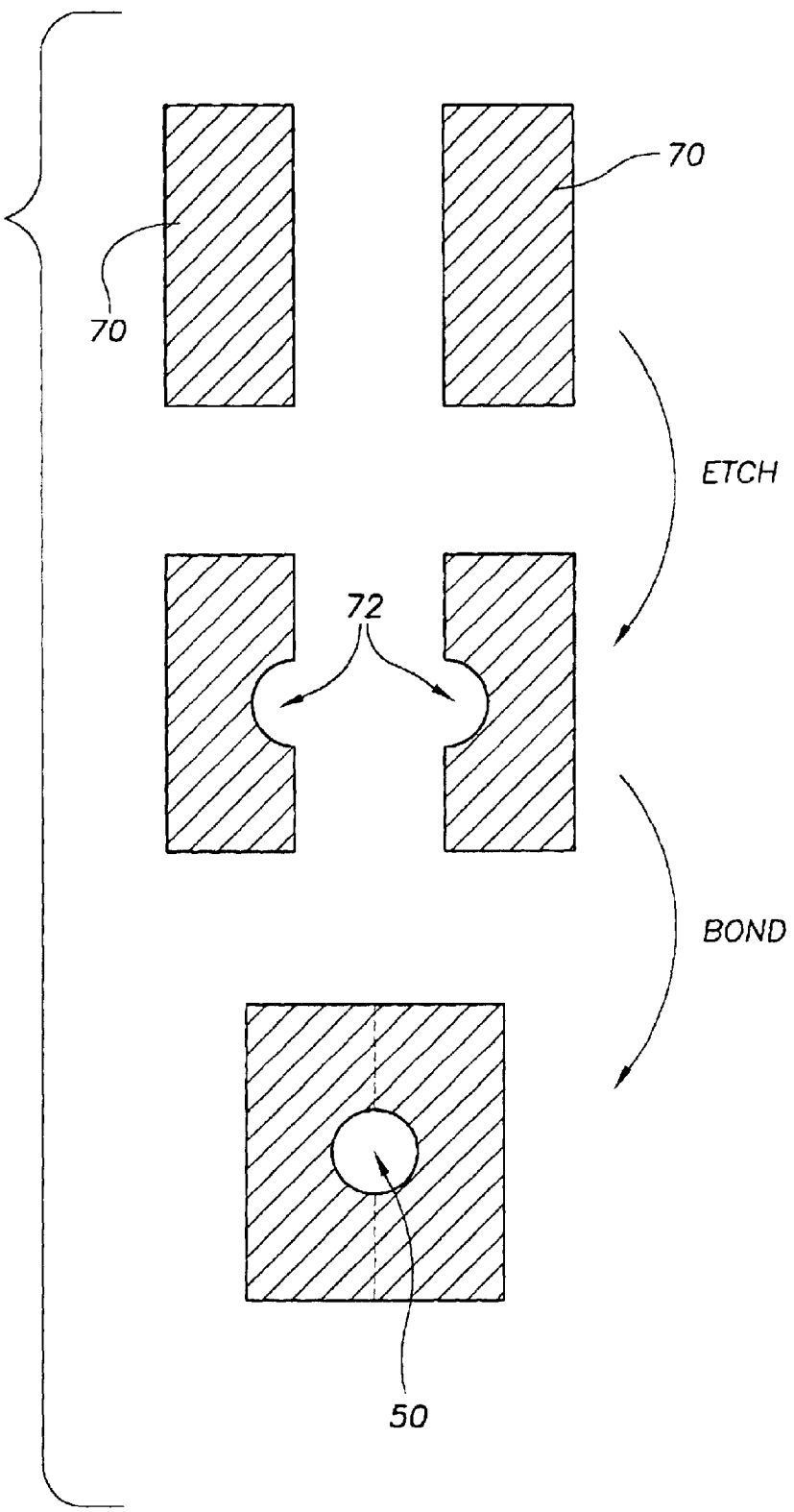

BIPOLAR PLATES AND END PLATES FOR FUEL CELLS AND METHODS FOR MAKING THE SAME

BACKGROUND OF THE INVENTION

Fuel cells are capable or converting electrochemical energy into electrical energy, and as such perform the same function as batteries. However, unlike batteries that run down and require recharging, fuel cells produce electricity as long as fuel is supplied to the cell. Fuel cells are also highly efficient devices. For example, fuel cells may convert fuels to useful energy at an efficiency as high as 60 percent, whereas internal-combustion engines are limited to efficiencies of near 40 percent or less. In addition, fuel cells do not necessarily depend on fossil fuels, do not emit noxious gases such as nitrogen dioxide and produce virtually no noise during operation. Fuel cells are therefore attractive sources of electrical power, and are being developed for use in power stations, car engines, portable electronic devices, etc.

The simplest of fuel cells consist of two electrodes (an anode and a cathode) sandwiched around an electrolyte. Hydrogen fuel is fed to the anode and oxygen (or air) is fed to the cathode. In the presence of a catalyst such as platinum, the hydrogen atom splits into a proton and an electron at the anode. The proton and electron then proceed along separate paths to the cathode; while the proton reaches the cathode via the electrolyte the electron creates a separate current through an electrical circuit. The proton and electron reunite at the cathode and react with oxygen to produce water. Overall, the electrochemical reactions involved are:

At the anode: $2H_2 \rightarrow 4H^+ + 4e^-$

At the cathode: $O_2 + 4e^- + 4H^+ \rightarrow 2H_2O$

Overall: $2H_2 + O_2 \rightarrow 2H_2O$

In order to maximize the contact area available between the hydrogen fuel, the oxygen, the electrode, and the electrolyte, and in order to minimize the distance that the protons need to travel between the electrodes, the electrodes and electrolyte are usually made to be flat and thin. In addition, the structure of the electrodes is usually porous.

The voltage produced between the anode and cathode of a fuel cell is typically on the order of about 0.7 V. As a consequence, in order to produce a practical voltage (e.g., between about 10 and 100 V) many fuel cells need to be connected in series. Such a collection of fuel cells is referred to as a fuel cell "stack". The preferred method of connecting neighboring fuel cells in a stack involves separating them with "bipolar plates". The bipolar plates must provide a good electrical connection between the anode and cathode of neighboring fuel cells and provide a means of feeding hydrogen to the anode of one fuel cell, oxygen to the cathode of its neighbor, all the while preventing the hydrogen and oxygen from mixing.

A bipolar plate is typically constructed by creating flow channels on two opposing faces of a conductive substrate (e.g., graphite or a metal). The flow channels provide a flow system for feeding hydrogen or oxygen to the electrodes, and the plateaus defined between the flow channels provide an electrical contact between the neighboring electrodes.

Existing fuel cells utilize bipolar plates that are machined out of solid graphite or metals, molded or pressed from composite graphitic materials, or formed out of the fuel cell material itself. These methods can be very expensive, have material compatibility limitations, and do not typically offer the stack designer a great amount of design flexibility, especially with respect to feature size and complexity. The limitations of current bipolar plate design and construction may become severe restrictions in the development of future fuel cells, particularly in the development of small scale portable fuel cells that may require very thin, substantially planar plates with narrow flow features. For example, graphitic plates are both brittle and porous and therefore break when machined and/or become permeable to hydrogen and oxygen fluids below a certain thickness.

In addition, in order to produce fuel cells that operate under stable conditions, there is a need in the art for the development of a variety of sensors and devices that would allow a variety of fuel cell parameters such as fuel flow rates, electric current load, gas and liquid pressures, fuel or cell temperature, etc. to be both monitored and controlled. Ideally, these sensors and devices could be incorporated within the relatively bulky bipolar plates; however, current bipolar plate construction and design methods do not provide the tools necessary for such developments and fine detail.

Accordingly, it would be desirable to provide bipolar and end plates and methods of making bipolar and end plates for fuel cells that overcome these limitations.

SUMMARY OF THE INVENTION

The present invention addresses and solves the above-mentioned problems by providing bipolar plates for fuel cell stacks that include a semi-conductive or a conductive body having a first face adapted to contact an anode of a first fuel cell and a second face adapted to contact a cathode of a second fuel cell. The first face comprising a flow channel adapted to confine fuel fluids, and the second face comprising a flow channel adapted to confine oxidizing fluids.

A method of making the bipolar plate of the present invention comprises the steps of providing a semi-conductive or conductive substrate having a first and a second face and etching a flow channel from both the first face and the second face.

DESCRIPTION OF THE DRAWING

FIG. 11 depicts the etching of a flow channel through the use of a patterned mask;

FIG. 12 depicts the creation of a conduit by etching and subsequent bonding.

DESCRIPTION OF CERTAIN PREFERRED EMBODIMENTS

Figure 1:
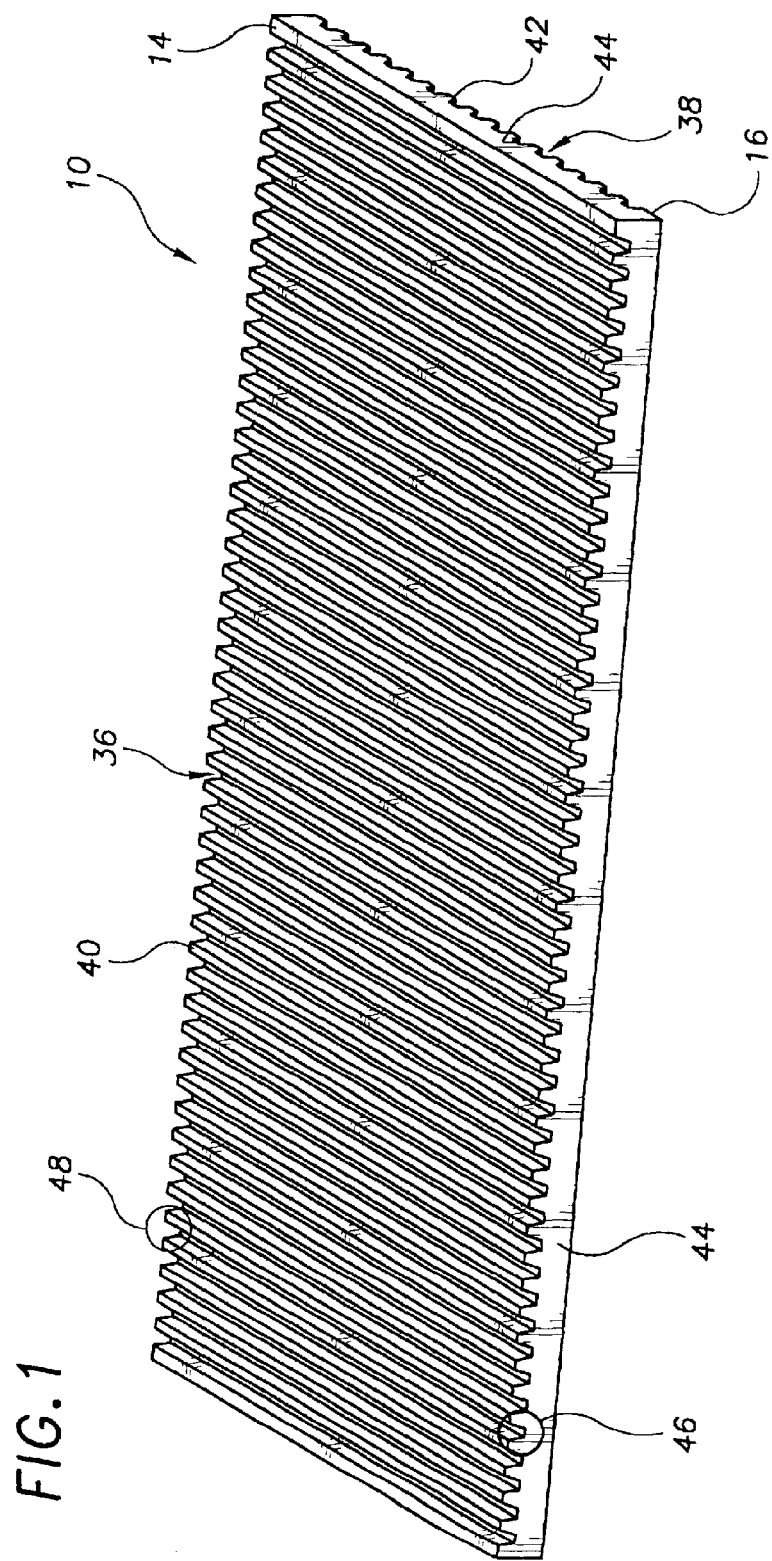
FIG. 1 is a perspective view of a simple bipolar plate.
Figure 2:
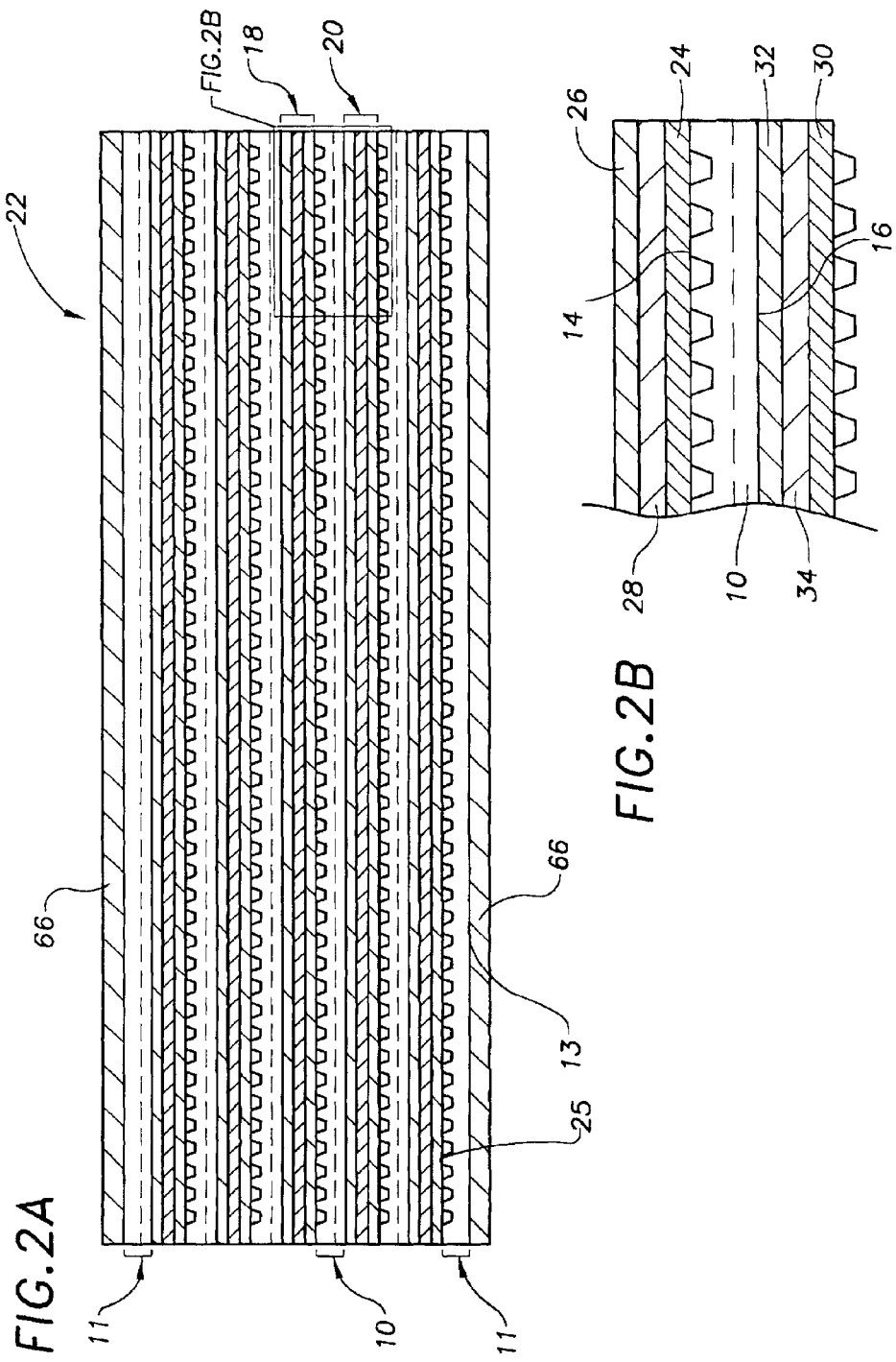
FIGS. 2A and 2B are side views of a fuel cell stack.

Referring to FIG. 1, the bipolar plate of the present invention is generally designated as 10. The bipolar plate 10 has a first face 14, and a second face 16 preferably opposed to the first face 14. Referring now to FIG. 2, the bipolar plate 10 is designed to form an electrical contact between a first fuel cell 18 and a second fuel cell 20. The first fuel cell 18, the bipolar plate 10, and the second fuel cell 20 are preferably arranged in a stack 22. The first fuel cell 18 includes an anode 24, a cathode 26, and an electrolyte 28 arranged between the anode 24 and the cathode 26. The second fuel cell 20 also includes an anode 30, a cathode 32, and an electrolyte 34 arranged between the anode 30 and the cathode 32. In order to form an electrical contact between the first fuel cell 18 and the second fuel cell 20, the first face 14 of the bipolar plate 10 is adapted to contact the anode 24 of the first fuel cell 18, and the second face 16 of the bipolar plate 10 is adapted to contact the cathode 32 of the second fuel cell 20.

It will be appreciated that any number of bipolar plates 10 of the present invention may be incorporated between any number of fuel cells 18 or 20 to form a stack 22. As is well known in the art, and as was mentioned earlier, in order to obtain practical power outputs and voltages, fuel cell stacks typically comprise between about 2 and about 200 individual fuel cells arranged in series (for a general introduction to bipolar plates and fuel cells see, for example, *Fuel Cell Systems Explained* by Larminie et al., John Wiley & Sons, New York, N.Y., 2000, the contents of which are hereby incorporated by reference). The working voltage (i.e., when producing an output current) of individual fuel cells typically ranges between about 0.4 V and about 0.7 V. The voltage across multiple fuel cells linked in series, as in the fuel cell stack 22 of FIG. 2, is equal to the sum of the voltages of the individual fuel cells that form the stack. The working voltage of a typical fuel cell stack may therefore potentially range between about 1 V and about 140 V.

It is to be understood that within the parameters discussed herein, the bipolar plate 10 may have any thickness as desired and/or suitable for a particular application. The bipolar plate 10 should ideally be as thin as possible, as light as possible, as electrically conductive as possible, yet should be sufficiently strong to bear the mechanical forces experienced within the stack 22, sufficiently impervious to gases or liquids to minimize leaks, and sufficiently inert to resist the corrosive environment experienced within the stack 22. The bipolar plate 10 may, for example, have any thickness between about 20 microns and about 10,000 microns, between about 20 microns and about 5,000 microns, between about 20 microns and about 3,000 microns, between about 50 microns and about 2,000 microns, between about 50 microns and about 1,000 microns, between about 100 microns and about 1,000 microns, or between about 500 microns and about 1,000 microns.

The first face 14 (or second face 16) of the bipolar plate 10 may have any width, length or diameter, and may be of any shape as desired and/or suitable for a particular application. Preferably, the faces 14 and 16 of the bipolar plate 10 are of substantially the same size and shape. The shape of the first face 14 (or second face 16) may be angular, curved, or a mixture thereof. The first face 14 (or second face 16) may, for example, be rectangular, triangular, trapezoidal, polygonal, circular, or oval. The width, length, or diameter of the first face 14 (or second face 16) may range anywhere between about 5 mm and about 500 mm, between about 10 mm and about 300 mm, between about 15 mm and about 200 mm, between about 20 mm and about 100 mm, or between about 25 mm and about 90 mm.

In order to maintain the structural stability of the fuel cell stack 22, the bipolar plate 10 should preferably have a coefficient of thermal expansion that is closely matched to the coefficient of thermal expansion of other components of the fuel cell stack 22. In certain embodiments, the bipolar plate 10 may be made of a material with a heat conductivity that is sufficiently large to prevent the build up of large temperature gradients within the bipolar plate 10. In certain other embodiments, the bipolar plate 10 may be made of a material with a heat capacity that is sufficiently small to promote a rapid increase in the temperature when the bipolar plate 10 is heated.

In certain embodiments of the present invention, the bipolar plate 10 may be a semi-conductive material. It is to be understood, that within the parameters discussed herein, the semi-conductive material may be any Group IV semiconductor, any Group III–V semiconductor, or any Group II–VI semiconductor as desired and/or suitable for a particular fuel cell application. For example, Group IV semiconductors may include silicon, germanium, and silicon germanium compounds; Group III–V semiconductors may include compounds of aluminum, gallium, indium, phosphorous, arsenic, and antimony, such as gallium arsenide, gallium phosphide, indium phosphide, indium antimonide, gallium aluminum arsenide, and indium gallium phosphide; and Group II–VI semiconductors may include compounds of zinc, cadmium, sulfur, selenium, and tellurium, such as zinc telluride, zinc sulfide, cadmium telluride, and zinc cadmium telluride.

The semi-conductive materials of the present invention may be doped with boron, aluminum, gallium, indium, nitrogen, phosphorous, arsenic, antimony, bismuth, or a mixture thereof. As is well known in the art, the electrical resistivity of a semi-conductive material can be adjusted by modifying the nature and/or concentration of the dopant. The semi-conductive material may comprise any concentration of any dopant as desired and/or suitable for a particular fuel cell application. The semi-conductive material may be doped in such a way that, at the fuel cell operating temperature, the resistivity of the bipolar plate 10 ranges between about 0.0001 $\Omega$.cm and about 100 $\Omega$.cm, between about 0.001 $\Omega$.cm and about 80 $\Omega$.cm, between about 0.01 $\Omega$.cm and about 70 $\Omega$.cm, between about 0.05 $\Omega$.cm and about 60 $\Omega$.cm, between about 0.1 $\Omega$.cm and about 50 $\Omega$.cm, between about 0.1 $\Omega$.cm and about 40 $\Omega$.cm, or between about 0.2 $\Omega$.cm and about 30 $\Omega$.cm.

In certain other embodiments of the present invention, the bipolar plate 10 may be a conductive material. The bipolar plate 10 may, for example, be a metal or a carbon material, preferably graphite. The bipolar plate 10 may be any metal or metal alloy that is compatible with the physical and chemical environment of the fuel cell stack 22. Preferred metals are heat- and/or corrosion-resistant and include, but are not limited to, stainless steel, nickel, iron, chromium, tungsten, carbon, cobalt, titanium, and alloys thereof (e.g., members of the INCONEL™ family from International Nickel Company of Wexford, Pa., and members of the HAYNES™ or HASTELLOY™ families from Haynes International of Kokomo, Ind.).

In addition to providing an electrical contact between the fuel cells 18 and 20 of the fuel cell stack 22, the bipolar plate 10 of the present invention is designed to distribute fuel fluids over the surface of the anode 24, and oxidizing fluids over the surface of the cathode 32. Referring now back to FIG. 1, to achieve this fluid distribution, the first face 14 of the bipolar plate 10 includes at least one flow channel 36, the flow channel 36 adapted to confine fuel gases, vapors, liquids, or aerosols. The second face 16 of the bipolar plate 10 also includes at least one flow channel 38, the flow channel 38 adapted to confine oxidizing gases, vapors, liquids, or aerosols.

The flow channel or channels 36 (or 38) may have any width or depth, and may have any cross-sectional profile as desired and/or suitable for a particular application, the cross-sectional profile defined as the profile of a cross-section taken at right angles to the flow channel 36 (or 38). The cross-sectional profile of the flow channel 36 (or 38) may be angular, curved, or a combination thereof. The cross-sectional profile of the flow channel 36 (or 38) may, for example, be semi-rectangular, semi-triangular, semi-trapezoidal, semi-polygonal, semi-circular, or semi-oval. The flow channel 36 (or 38) may have any width between about 1 micron and about 5,000 microns, between about 1 micron and about 2,000 microns, between about 10 microns and about 1,000 microns, between about 15 microns and about 500 microns, between about 20 microns and about 500 microns, between about 50 microns and about 300 microns, or between about 75 microns and about 200 microns. The flow channel 36 (or 38) may have any depth between about 1 micron and about 3,000 microns, between about 1 micron and about 2,000 microns, between about 1 micron and about 1,000 microns, between about 5 microns and about 500 microns, between about 5 microns and about 200 microns, between about 10 microns and about 150 microns, or between about 20 microns and about 100 microns. Within these ranges, the width and depth of the flow channel 36 (or 38) will be determined in part by the dimensions of the bipolar plate 10. The width, depth, and cross-sectional profile of the flow channel 36 (or 38) may be substantially uniform or non-uniform over the length of the flow channel 36 (or 38).

As illustrated in FIG. 1 (and further in FIGS. 3 and 4), the flow channel or channels 36 (or 38) on the first face 14 (or second face 16) of the bipolar plate 10 define plateaus 40 (or 42) therebetween. It will be appreciated that the surface area of the first face 14 (or second face 16) of the bipolar plate 10, is divided between the flow channel or channels 36 (or 38) and the plateaus 40 (or 42). It will also be appreciated that the volume of fuel (or oxidizing) fluid confined by the flow channel or channels 36 (or 38) is determined in part by the width and depth of the flow channel or channels 36 (or 38). It will further be appreciated that the surface area of the plateaus 40 (or 42) determines in part the fraction of the surface area of the first face 14 (or second face 16) that is adapted to contact the anode 24 (or the cathode 32). It will yet further be appreciated that the surface area of the plateaus 40 (or 42) is determined in part by the width of the flow channels 36 (or 38) and in part by the number of flow channels 36 (or 38) associated with the first face 14 (or second face 16).

Some of the advantages of a large contact surface area between the first face 14 (or second face 16) of the bipolar plate 10 and the anode 24 (or cathode 32) include greater electrical conductivity between the fuel cells 18 or 20 of the stack 22 and better physical support of the stack 22. However, without an increase in the depth of the flow channel or channels 36 (or 38) or a change in the cross-sectional profile of the flow channel or channels 36 (or 38), a large contact surface area will automatically be associated with a small flow volume within the flow channel or channels 36 (or 38) and hence will mitigate against good fluid flow over the anode 24 (or cathode 32). Choosing the width, depth, path, and cross-sectional profile for the flow channel 36 (or 38), and the number of flow channels 36 (or 38) when more than one flow channel 36 (or 38) is present, will therefore always involve making a compromise between achieving adequate electrical contact between the fuel cells 18 and 20 of the stack 22 and achieving adequate fluid flow within the flow channel or channels 36 (or 38).

One of the advantages of having a large number of narrow flow channels 36 (or 38) associated with the first face 14 (or second face 16) instead of a few wider flow channels 36 (or 38) is that it provides, for a fixed flow volume (defined as the volume confined within the flow channels 36 (or 38)), a larger surface area for contact and hence reaction between the electrode and the fuel or oxidizing fluid. However, the pressure drop along narrow flow channels is greater than along wider flow channels, and hence, maintaining the same flow rate in the narrower flow channels will require a greater energy input. Deciding on the dimensions and number of flow channels to be associated with the first face 14 (or second face 16) will therefore also involve a tradeoff between achieving adequate contact between the electrodes and fuel or oxidizing fluids and achieving adequate fluid flow within the flow channel or channels 36 (or 38).

Figure 3:
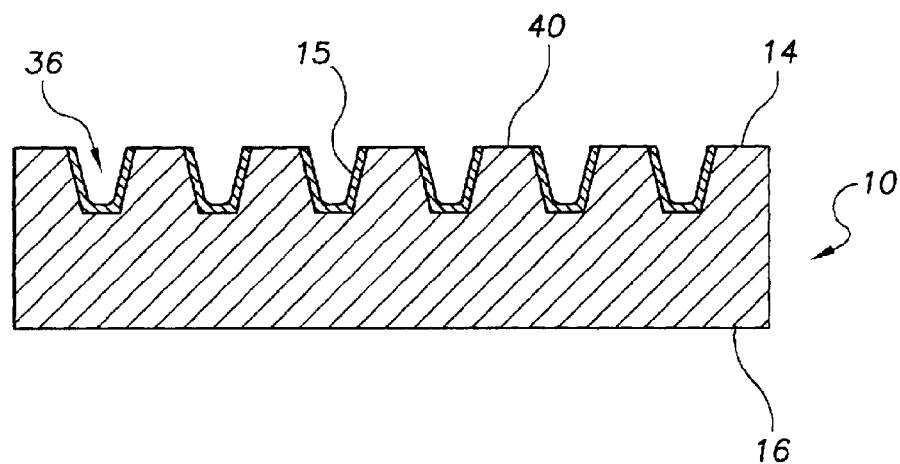
FIG. 3 is a cross-sectional view of a simple bipolar plate.
Figure 4:
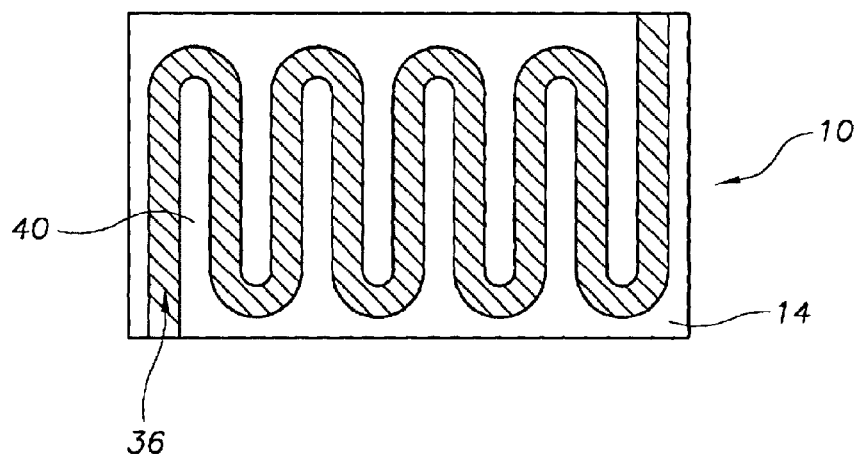
FIG. 4 is a top view of a bipolar plate showing a flow channel with a serpentine path.

The flow channel 36 (or 38) may follow any path across the first face 14 (or second face 16) of the bipolar plate 10. The only restriction placed on the characteristics of the path is the requirement that it be in communication with the side or sides 44 of bipolar plate 10 in at least two locations (i.e., that there be at least one inlet region 46 and at least one outlet region 48 for communication with an inlet and outlet flow manifold). The path may be substantially linear or substantially nonlinear. In certain preferred embodiments, the flow channel 36 (or 38) may follow a path that is serpentine. In certain embodiments, the flow channel 36 (or 38) may be branched. In certain preferred embodiments, the characteristics of the flow channel 36 (or 38) may be chosen in order to optimize both the reactant depletion and product removal profiles along the path of the flow channel 36 (or 38). FIGS. 3 and 4 depict side and top views respectively, of a bipolar plate 10.

Although not shown, it will be appreciated that the at least one inlet region 46 and at least one outlet region 48 of the flow channel or channels 36 may be attached to external inlet and outlet manifolds (not shown for simplicity) that are in turn connected to an external flow system (not shown for simplicity) that maintains a supply of fuel to the anode 24 and removes unwanted waste products and heat. It will also be appreciated that the at least one inlet region 46 and at least one outlet region 48 of the flow channel or channels 38 may be connected to a separate external flow system (also not shown for simplicity) that maintains a supply of oxidizing agent to the cathode 32 and also removes unwanted waste products and heat. The design of the fluid flow system and the inlet and outlet manifolds may include a heat exchanging system that transfers heat via the fuel (or oxidizing) flow system from the hotter fuel cells located towards the center of the stack 22 to the colder fuel cells located towards the extremities of the stack 22. Such a design reduces the temperature gradient across the stack 22 and therefore minimizes the risk of fuel cell failure. Various designs for connecting flow channels to flow manifolds and flow systems are described in the art, see for example, *Fuel Cell Systems Explained* by Larminie et al., supra.

Figure 5:
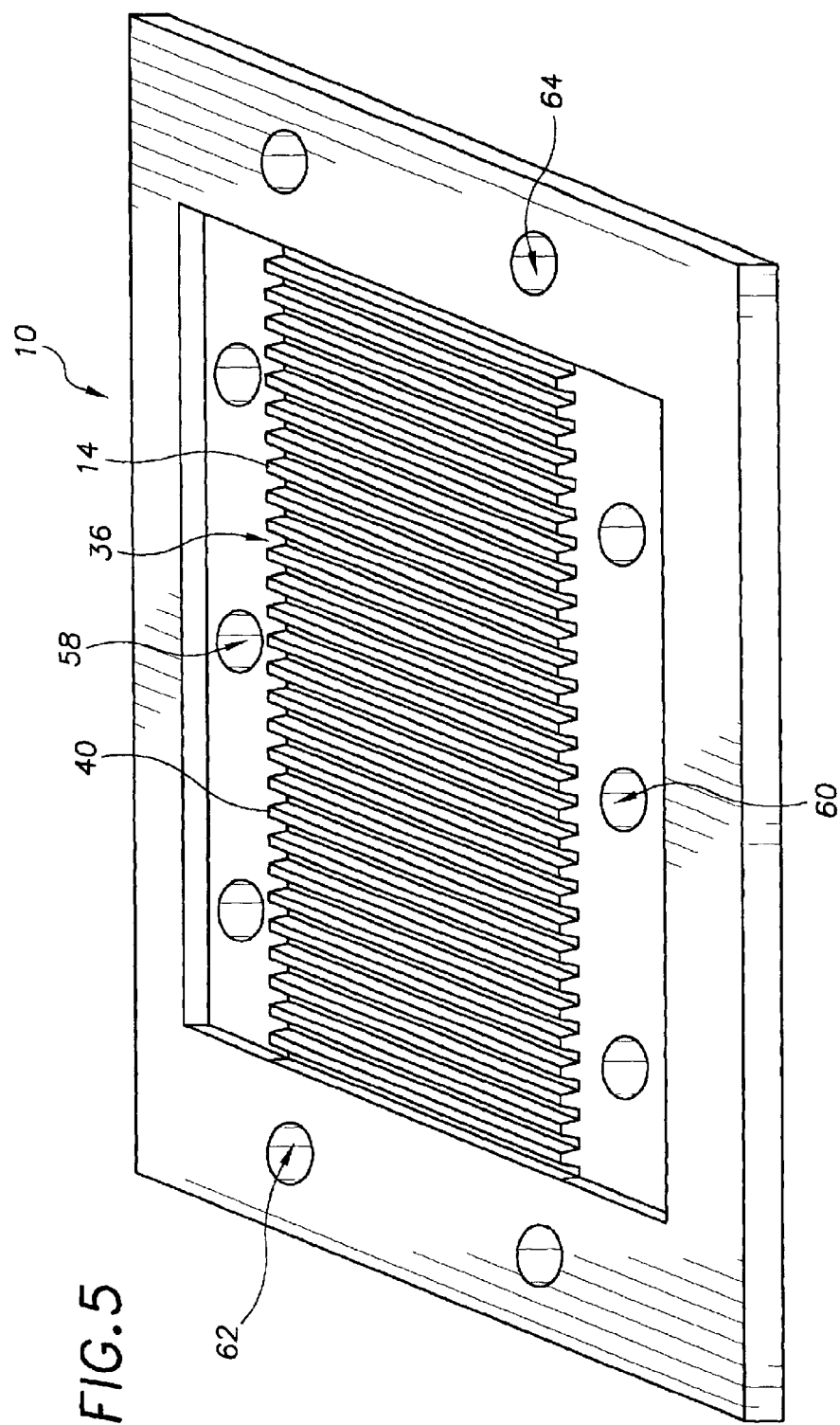
FIG. 5 is a perspective view of a bipolar plate that includes internal flow manifolds.

Referring now to FIG. 5, it is further to be understood, that in certain embodiments, the bipolar plate 10 may further comprise internal inlet 58 (or 62) and internal outlet 60 (or 64) flow manifolds. Such an embodiment would reduce the challenges (e.g., external seals etc.) associated with connecting the bipolar plate of FIG. 1 with an external flow manifold. As illustrated in FIG. 5, fuel fluids could be pumped (via an external flow system) into the flow channel or channels 36 (or 38) via the internal inlet flow manifold 58 (or 62) and would then exit via the internal outlet flow manifold 60 (or 64).

It is yet further to be understood that, the characteristics (e.g., width, depth, cross-sectional profile, number, and path) of the flow channels 36 and 38 are independent. In certain embodiments, some or all of the characteristics of the flow channels 36 and 38 may be substantially the same. However, in certain other embodiments, some or all of the characteristics of the flow channels 36 and 38 may be substantially different. In certain preferred embodiments, the width, depth, cross-sectional profile and number of the flow channels 36 and 38 may be substantially the same. As illustrated in FIG. 1, in such embodiments, the paths of the flow channels 36 and 38 may, for example, be linear and mutually perpendicular. In other embodiments, the paths of the flow channels 36 and 38 may be linear and mutually parallel. It will be appreciated that in such parallel embodiments, the flow within the flow channels 36 and 38 may be concurrent or counter-current.

It is further to be understood that when more than one flow channel 36 (or 38) is associated with the first face 14 (or second face 16), the characteristics of the flow channels 36 (or 38) are also independent. In certain preferred embodiments, some or all of the characteristics of the channels 36 (or 38) may be substantially the same. As illustrated in FIG. 1, in such embodiments, the paths of the flow channels 36 (or 38) may be linear and mutually parallel. In certain other embodiments, some or all of the characteristics of the channels 36 (or 38) may be substantially different.

In certain embodiments, the first face 14 (and/or second face 16) including the flow channel or channels 36 (or 38) and plateaus 40 (or 42) may further be coated with a precious metal such as gold. As will be appreciated by one of ordinary skill in the art, the presence of an unreactive precious metal layer may prove advantageous in preventing the build of an insulating oxide layer on the faces 14 and/or 16 of the bipolar plate 10.

It is to be understood, that within the parameters discussed herein, the fuel gases, vapors, liquids or aerosols confined by the flow channel or channels 36 of the first face 14 may comprise any fuel as desired and/or suitable for a particular fuel cell application. As is well known in the art, fuel gases, vapors, liquids or aerosols for fuel cells may comprise hydrogen, carbon monoxide, ammonia, water, alkali metal hydrides, alcohols, hydrocarbons, or mixtures thereof. Preferred alkali metal hydrides include lithium hydride, sodium hydride, aluminum hydride, calcium hydride, potassium hydride, lithium borohydride, sodium borohydride, and aluminum borohydride. Preferred alcohols include methanol and ethanol. Preferred hydrocarbons include methane, ethane, butane, propane, and pentane. Preferred hydrocarbon mixtures include hydrocarbon reformate mixtures, gasoline, kerosene, diesel, and natural gas.

It is also to be understood, that within the parameters discussed herein, the oxidizing gases, vapors, liquids, or aerosols confined by the flow channel or channels 38 of the second face 16 may comprise any oxidizing agent as desired and/or suitable for a particular fuel cell application. As is well known in the art, oxidizing gases, vapors, liquids, or aerosols for fuel cells may comprise air, oxygen, hydrogen peroxide, water, a nitrous oxide, or mixtures thereof.

In certain embodiments of the present invention, the flow channel 36 on the first face 14 of the bipolar plate 10 may be coated with a reforming catalyst 15 to enable the in situ reforming of fuels. The flow channel 36 may be substantially coated over its entire length or may be selectively coated over sections of its length. Reforming catalysts facilitate the conversion of naturally occurring fuels (e.g., ammonia, methanol, methane, gasoline, kerosene, diesel, etc.) into hydrogen and include platinum, ruthenium, rhodium, nickel, cerium, iron, chromium, cobalt, manganese, copper, aluminum, and oxides thereof.

In one embodiment, the catalyst may be used to facilitate the decomposition of ammonia into hydrogen and nitrogen. In another embodiment, the catalyst may be used to facilitate the release of hydrogen from alkali metal hydrides. As is known in the art, the release of hydrogen from alkali metal hydrides occurs readily at room temperature in the presence of catalysts such as ruthenium. In yet another embodiment, the catalyst may be used to accelerate the conversion of hydrocarbons and/or alcohols to hydrogen and carbon monoxide and/or carbon dioxide by steam reforming. Steam reforming of hydrocarbons is typically performed over an alumina, zirconia, or silica supported nickel catalyst at temperatures that exceed 500° C. Steam reforming of alcohols involves a smaller activation barrier than steam reforming of hydrocarbons and can therefore be performed over a zinc oxide supported copper catalyst at more modest temperatures (e.g., 250° C.).

Figure 6:
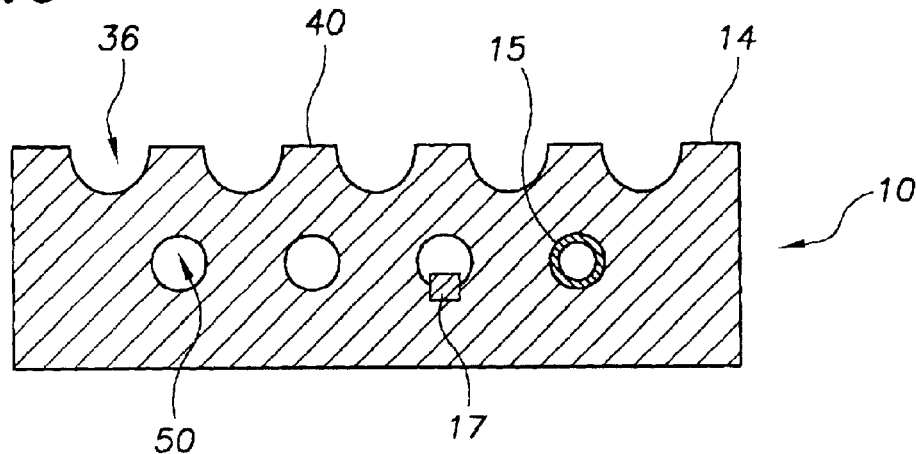
FIG. 6 is a side view of a bipolar plate that includes a conduit and a sensor.

Referring now to FIG. 6, the bipolar plate 10 may further include a conduit 50 that passes through the bipolar plate 10. The conduit 50 may have any cross-sectional profile and dimension as desired and/or suitable for a particular application, the cross-sectional profile defined as the profile of a cross-section taken at right angles to the path of the conduit 50. In preferred embodiments, the conduit 50 has a circular cross-sectional profile and a generally tubular shape. The conduit 50 may have any cross-sectional dimension (e.g., width or diameter) depending on the dimensions of the bipolar plate 10. Preferably, the cross-sectional dimension of the conduit 50 ranges anywhere between about 1 micron and about 2,000 microns, between about 1 micron and about 1,000 microns, between about 10 micron and about 500 microns, between about 20 microns and about 500 microns, between about 50 micron and about 500 microns, between about 100 microns and about 400 microns, or between about 150 microns and about 300 microns. The conduit 50 may follow any path through the bipolar plate 10, for example, the path may be substantially linear or it may be serpentine. In certain embodiments the bipolar plate 10 of the present invention may include a plurality of conduits 50. As with the flow channels 36 and 38, the conduit or conduits 50 each include at least one inlet region and at least one outlet region that allow the conduit or conduits 50 to be connected to inlet and outlet manifolds (again not shown for simplicity) that are in turn connected to a flow system (not shown for simplicity).

In certain embodiments, the conduit 50 may be a temperature regulating conduit. The conduit 50 may, for example, be adapted to carry a cooling fluid. The electrochemical reactions that occur within fuel cells are exothermic, and as a consequence heat management plays an important role in the design of fuel cells. Passing an externally cooled fluid through the conduit 50 of the bipolar plate 10 would allow waste heat to be rapidly and efficiently removed from the fuel cell stack 22. It will be appreciated, that the conduits 50 of the fuel cells of a fuel cell stack 22 may be connected to each other, to a flow system, and to a cooling system via any known approach. One could envisage, for example, designing the manifolds and flow system in such a way that the cooling fluid passes through the bipolar plates that are located towards the center of the fuel cell stack 22 before passing through the bipolar plates that are located towards the edges of the fuel cell stack 22. As was described earlier for the flow channels 36 and 38, such a design would reduce the temperature gradient between the hot and cold spots of the fuel cell stack 22.

Alternatively, the conduit 50 may be adapted to carry a heating fluid. Fuel cells perform at temperatures that exceed ambient temperature (e.g., 60–80° C. for proton exchange membrane fuel cells to 800–1,000° C. for solid oxide fuel cells) and therefore typically need to be pre-heated before they can be used. Although this may not be such a problem when fuel cells are run on a continual basis (e.g., stationary applications such as power plants), it becomes a limitation when fuel cells are used intermittently (e.g., portable applications such as cars, electronic devices, etc.). Passing an externally heated fluid through the conduit 50 of the bipolar plate 10 could be used to rapidly pre-heat fuel cells or to maintain temperature when the fuel cells are in a low power or standby state.

The cooling or heating fluid may be a liquid, a vapor, or a gas. Gases are easier to manipulate, but tend to require larger conduits than liquids. The heating and cooling fluid may comprise air, nitrogen, noble gas elements, water, oil, or mixtures thereof. In certain embodiments, the fuel or oxidizing fluid may be routed through the temperature regulating conduit 50 of the bipolar plate 10.

It will be appreciated that the bipolar plate 10 may comprise a single temperature regulating conduit 50 or a plurality of temperature regulating conduits 50. It will also be appreciated that not all bipolar plates 10 within a fuel cell stack 22 need necessarily include a temperature regulating conduit 50. It is also to be understood that the temperature regulating conduit or conduits 50 may carry the same fluid for different purposes, different fluids for the same purpose, or different fluids for different purposes at separate points in time. For example, it may be advantageous to use a particular heating fluid when the stack is in pre-heat mode and then to use a different cooling fluid once the stack shifts into work mode.

Figure 7:
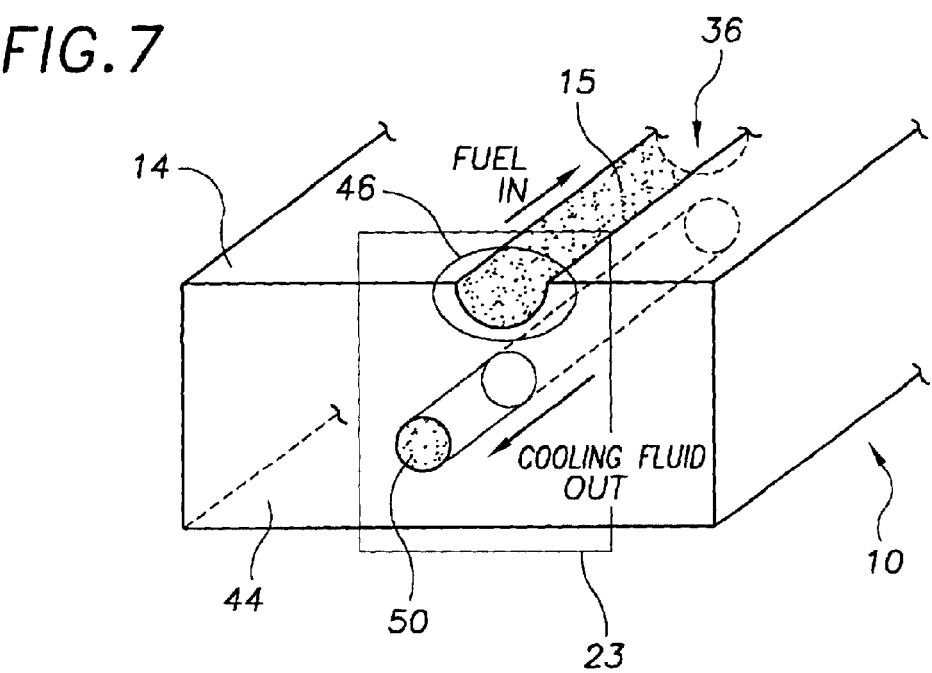
FIG. 7 is a perspective view of a bipolar plate that includes an internal recuperative heat exchanger.

The temperature regulating conduit or conduits 50 may be designed in such a way that they form an integral recuperative heat exchanger 23. A recuperative heat exchanger 23 of the present invention would be capable of, for example, efficiently transferring heat produced by the electrochemical reactions within the fuel cell stack 22 to regions of the bipolar plate 10 (or fuel cell stack 22) involved in reforming fuel fluids. As shown in FIG. 7, such a design may involve, for example, passing the outlet of a temperature regulating conduit 50 along a path that is substantially parallel and in close proximity to the inlet region 46 of the flow channel 36.

In certain preferred embodiments, the conduit 50 may be a fuel reforming conduit. In such embodiments, the inner surface of the conduit 50 may preferably be coated with a reforming catalyst 15 as described earlier for the flow channel 36. In the presence of a fuel reforming conduit 50, one could envisage creating a flow manifold that connects the fuel reforming conduit 50 and flow channel 36. In such an embodiment, the fuel fluid might pass initially through the fuel reforming conduit 50 wherein an internal reforming process would occur in the presence of a suitable catalyst, and the hydrogen produced would then pass through the flow channel 36. In certain embodiments, such a flow manifold may further comprise filters that are adapted to remove unwanted products or poisons from the reformate such as, for example, nitrogen, sulfur, sulfur oxides, carbon monoxide, or carbon dioxide. In order to minimize the potential emission of unreacted fuels, in certain embodiments, the bipolar plate 10 may yet further include an "exhaust" fuel catalytic combuster included in conduit 50 adapted to receive the fuel and oxidizer fluids once they have left the flow channel 36. The conduit 50 in this case provides a catalytic surface on which a complete reaction of fuel and oxidizer can take place prior to final exhausting to the environment. The heat derived from this catalytic reaction can be used advantageously for maintenance of stack temperature or preheating reactants or initial start up heating of the stack thereby increasing the rate of start temperature.

It is to be understood that in certain embodiments, the bipolar plate 10 of the present invention may comprise both a temperature control conduit 50 and a separate reforming conduit 50. It is further to be understood that in certain other embodiments, the temperature control conduit 50 and reforming conduit 50 may be one and the same conduit 50.

Figure 8:
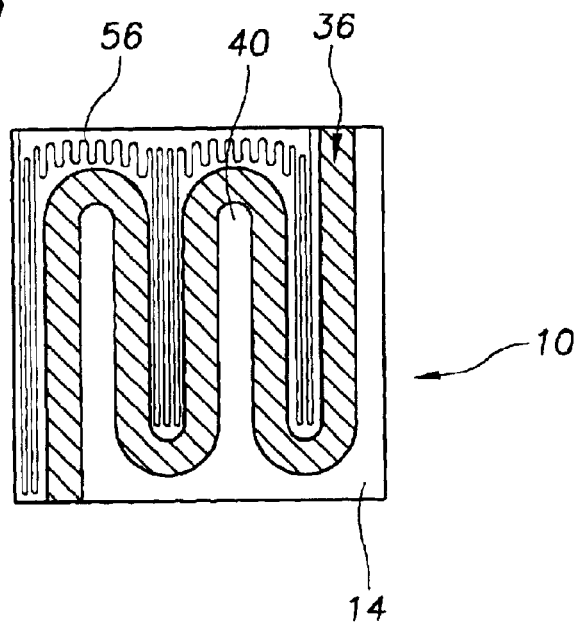
FIG. 8 is a top view of a bipolar plate that includes a resistive heating element.

Referring now to FIG. 8, the bipolar plate 10 may include a resistive element 56. The resistive element 56 may be located within the bulk of the bipolar plate 10, or on the surface of the bipolar plate 10. For example, the resistive element 56 may be located on one of the faces 14 or 16 of the bipolar plate 10. Preferably, the resistive element is encased within the bipolar plate 10, embedded within the plateaus 40 or 42, or embedded within the flow channels 36 or 38 of the bipolar plate 10. As was described earlier, fuel cells typically require pre-heating, therefore, in preferred embodiments, the resistive element 56 is adapted to heat the bipolar plate 10. The resistive element 56 may be a thin film resistive element, a thick film resistive element, or a diffused resistor. Preferred thin film resistive elements 56 have a thickness that ranges anywhere between about 0.01 micron and about 10 microns, between about 0.05 micron and about 10 microns, between about 0.05 micron and about 5 microns, between about 0.05 micron and about 2 microns, between about 0.1 micron and about 1 microns, or between about 0.2 micron and about 0.7 microns. Preferred thick film resistive elements 56 have a thickness that ranges anywhere between about 1 micron and about 250 microns, between about 5 microns and about 250 microns, between about 5 microns and about 100 microns, between about 10 microns and about 75 microns, or between about 20 microns and about 50 microns. It will be appreciated that the resistive element 56 is preferably connected to an external source of electrical current. The resistive element 56 may comprise any suitable conductive material including but not limited to doped silicon, nickel, chromium, tantalum, aluminum, molybdenum, tungsten, titanium, aluminum, palladium, platinum, suicides thereof, oxides thereof, and mixtures thereof.

In certain embodiments of the present invention, the bipolar plate 10 may further comprise a sensor 17. The sensor 17 may be located within the bulk of the bipolar plate 10 or on the surface of the bipolar plate 10. In preferred embodiments, the sensor 17 is embedded within the bipolar plate 10, encased within a plateau 41 (or 42) or flow channel 36 (or 38), or embedded within a conduit 50. Fuel cell performance is dependent on a number of complex parameters that include temperature, pressure, fluid flow rate, chemical composition of the fuel fluid, chemical composition of the oxidizing fluid, concentration of poisons, electrolyte volume, etc. The ability to monitor these parameters and to integrate their fluctuations with external feedback mechanisms would, for example, improve the reliability and efficiency of fuel cells, facilitate the start up and shut down of fuel cell stacks, enable the control of power output transients, and provide for the inclusion and control of various safety measures (e.g., a fusible link). Preferred sensors 17 are microsensors with dimensions that range between about 1 micron and about 200 microns, between about 1 micron and about 100 microns, between about 1 micron and about 50 microns, between about 5 microns and about 50 microns, between about 10 microns and about 50 microns, or between about 15 microns and about 40 microns.

The sensor 17 may, for example, be a mechanical sensor (e.g., a piezoresistor, a resonant sensor, a capacitive sensor, etc.), a thermal sensor (e.g., a thermistor, a thermocouple, etc.), a magnetic sensor (e.g., a Hall Effect sensor), an electrical sensor (e.g., a voltage sensor), a chemical sensor (e.g., a MOSFET sensor, an ISFET sensor, a fiber optic chemical sensor, etc.), or a radiation sensor (e.g., a photodiode, a phototransistor, a pyroelectric sensor, etc.). The sensor 17 may be adapted to measure parameters that include, but are not limited to, the pressure within the flow channel 36 (or 38) or conduit 50; the fluid flow rate within the flow channel 36 (or 38) or conduit 50; the temperature of the bipolar plate 10; the concentration of hydrogen, oxygen, water, hydrogen ions, hydrogen peroxide, carbon monoxide, carbon dioxide, sulfur, sulfur oxides, methanol, ethanol, methane, ethane, butane, propane, or pentane within the flow channel 36 (or 38) or conduit 50; or the voltage of a cell or set of cells in a stack as measured with respect to a specific reference potential.

Pressure may be measured using sensors 17 that comprise thin membranes. A sealed (preferably evacuated) cavity is located on one side of the membrane, and the other side of the membrane is exposed to the pressure to be measured. The deformation of the membrane may be monitored, for example, using piezoresistors or capacitive sensors. Piezoresistors detect changes in resistance that occur when certain materials are placed under strain. Capacitive sensors detect fluctuations in capacitance that occur when the distance separating the plates of a capacitor varies.

The flow rate of fluids within the channel 36 (or 38) or conduit 50 can be measured with sensors 17 that comprise hydraulic elements such as turbines. Alternatively, the flow rate of fluids can be monitored using sensors 17 that comprise a heating element (e.g., a resistive element). Such sensors 17 rely on the fact that the temperature increase of a fluid between the point at which it enters a sensor and the point at which it leaves the sensor (i.e., after it has passed over the heating element) is proportional to the mass flow rate.

As is well known in the art, temperature may be measured using thermistors made from materials with temperature dependent resistance (e.g., metals such as platinum but also semiconductors). Alternatively, temperature may be measured using thermocouples or thermopiles that include a circuit made from two dissimilar semi-conductive or conductive materials (e.g., copper and iron).

Chemical sensors 17 are typically based around a field effect transistor (FET) such as a metal oxide semiconductor field effect transistor (MOSFET), an ion sensitive field effect transistor (ISFET), or an ISFET derivative (e.g., a MEMFET, a SURFET, or a CHEMFET). Alternatively, chemical sensors 17 may comprise fiber optic elements that allow the concentration of chemicals to be monitored via, for example, their absorbance at a particular wavelength of radiation emitted by a light emitting diode (LED).

It will be appreciated that these examples are not intended to limit the range or type of sensors 17 that may be included in the present invention, and that the bipolar plate 10 may comprise any sensor 17 as desired and/or suitable for a particular application.

Figure 9:
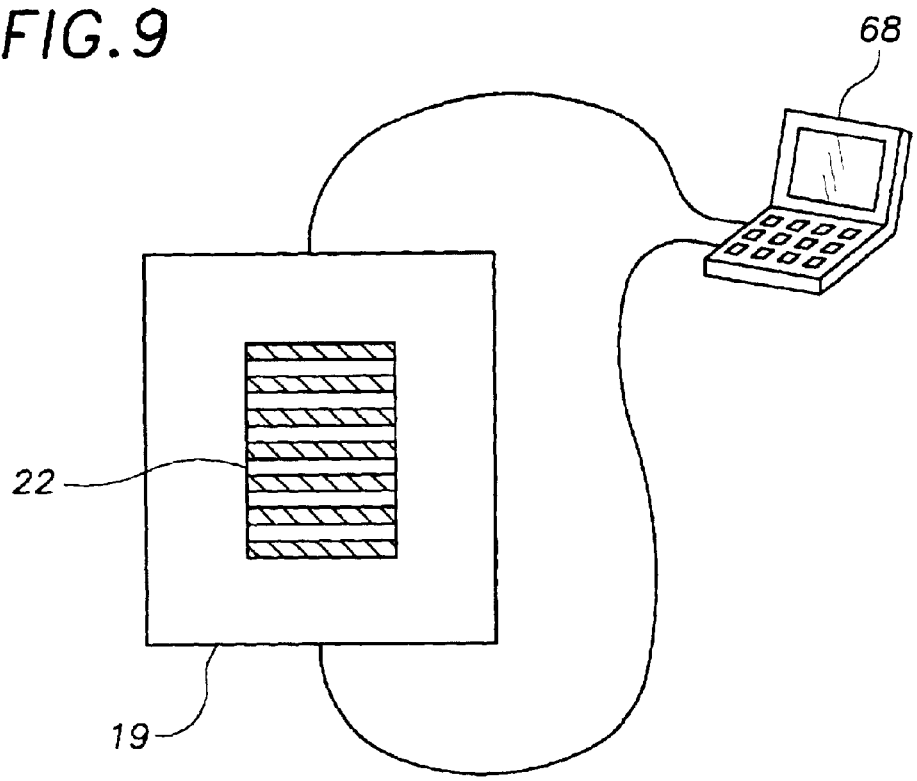
FIG. 9 is an electrical schematic diagram of a circuit that includes a fuel cell power supply and a device.

It is to be understood that the bipolar plate 10 of the present invention may be incorporated into any fuel cell stack 22, and that a fuel cell stack 22 that includes an inventive bipolar plate 10 may be incorporated within any power supply 19. As illustrated in FIG. 9, it is further to be understood that any power supply 19 that includes an inventive fuel cell stack 22 may be used to power any device 68. Preferably, the device 68 is a portable electronic device such as, for example, a laptop computer, a radio, a CD player, a video camera, a mobile phone, a wireless device, a power tool, etc.

Figure 10:
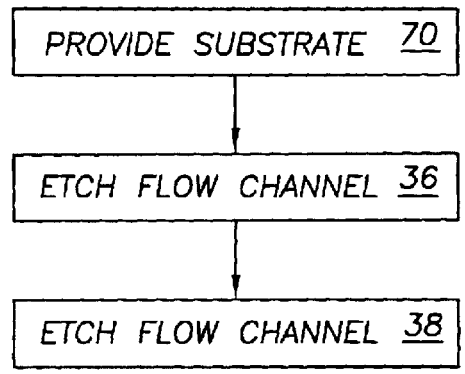
FIG. 10 is a flow chart depicting the simplest steps involved in the method of the present invention.

As outlined in FIG. 10, a method of making the bipolar plate 10 of the present invention comprises the steps of (a) providing a substrate 70 having a first face 14 and a second face 16 and (b) etching fluid flow channels 36 and 38 from the first face 14 and second face 16, respectively. In certain embodiments, the substrate 70 is a semi-conductive material such as a Group IV semiconductor, a Group III–V semiconductor, or a Group II–VI semiconductor. In preferred embodiments, the semiconductor substrate 70 is doped with boron, aluminum, gallium, indium, phosphorous, arsenic, antimony, or bismuth. In certain other embodiments, the substrate 70 is a metal such as stainless steel, nickel, iron, chromium, tungsten, carbon, cobalt, titanium, or an alloy thereof. In yet certain other embodiments, the substrate 70 is a carbon material, preferably graphite.

As illustrated in FIG. 11, in certain embodiments, the step of etching a fluid flow channel 36 (or 38) is preceded by the steps of (a) applying at least one mask 21 to the first face 14 (or second face 16) of the substrate 70, and (b) patterning the at least one mask 21 by photolithography. As is well known in the art, patterned masks are commonly used to direct the etching of patterns on substrates. The mask 21 may be a hard mask or a soft mask. It is to be understood that any suitable hard or soft mask may be used according to the method of the present invention. Hard masks are typically oxides, carbides, or nitrides of the substrate material (e.g., a silicon nitride mask for a silicon substrate), oxides, carbides, or nitrides of a chemically similar material (e.g., an aluminum oxide mask for a gallium arsenide substrate), or metallic (e.g., aluminum, titanium, chromium and nickel). Soft masks are typically light sensitive polymers that are weakened (positive resist) or strengthened (negative resist) when exposed to visible or ultraviolet radiation, and selectively removed when subsequently processed with an appropriate developer solution. The hard mask may be grown on the first face 14 (or second face 16) of the substrate 70. In preferred embodiments, the step of applying a hard mask is performed by sputter deposition, chemical vapor deposition, evaporation, or combinations thereof. In preferred embodiments, the step of applying a soft mask is performed by spin coating, dip coating, or dry film laminating.

The step of patterning the mask 21 once applied to the substrate 70 may be performed by any known photolithographic technique. As is well known in the art, soft masks are typically directly patterned by irradiation through a chrome/glass or chrome/quartz mask while hard masks usually require further processing with a soft mask.

In certain embodiments, the steps of (a) applying at least one mask 21 to the first face 14 (or second face 16) of the substrate 70, and (b) patterning the at least one mask 21 by photolithography may be followed by a step of doping the exposed substrate 70 with boron prior to the step of etching a fluid flow channel 36 (or 38). As is well known in the art, the etching of materials such as silicon with etchants such as potassium hydroxide or tetramethyl ammonium hydroxide (TMAH) is slowed or even stopped in the presence of high concentrations of boron dopant. It will be appreciated, that the use of boron concentration dependent etching could be advantageously used to control the etching process. As is well known in the art, boron doping may be achieved by ion implantation, high temperature diffusion, or a combination thereof.

The step of etching the flow channel 36 (or 38) may be performed by any known wet or plasma etching means. The step of etching the flow channel 36 (or 38) may, for example, involve the use of wet anisotropic etchants, wet isotropic etchants, plasma anisotropic etchants, plasma isotropic etchants, or some combination thereof. It will be appreciated that the specific etching means adopted will depend on (a) the nature of substrate 70, (b) the nature of the mask 21, (c) the desired timescale of the etching step, (d) the desired dimensions (e.g., width and depth) of the flow channel, (e) the desired cross-sectional profile (e.g., angular or curved) of the flow channel, and (f) the associated costs.

As is well known in the art, isotropic etchants attack the material being etched at the same rate in all directions and as a consequence tend to produce etches with curved cross-sectional profiles. Anisotropic etchants on the other hand attack the material being etched at different rates in different directions and can therefore be used to produce etches with more vertical or angular cross-sectional profiles.

Wet etchants are typically acids or alkalis. Hydrofluoric acid, hydrochloric acid, nitric acid, sulfuric acid, acetic acid, phosphoric acid, hydrogen peroxide, and mixtures thereof are non-limiting examples of wet isotropic etchants commonly used to etch silicon substrates. Potassium hydroxide, tetramethyl ammonium hydroxide, ammonium hydroxide, sodium hydroxide, cerium hydroxide, ethylene diamine pyroatechol, or aqueous ferric chloride, are non-limiting examples of wet anisotropic etchants commonly used to etch silicon substrates. Electrochemical etchants are further examples of wet etchants that may be used according to the present invention.

Plasmas are highly ionized gases composed of ions, electrons, and neutral particles. Plasmas used to etch silicon typically include fluorine compounds such as sulfur hexafluoride, nitrogen trifluoride, tetrafluoromethane, trifluoromethane, dichlorodifluoromethane, trifluoroiodomethane, perfluoroethane, perfluoropropane, and perfluorocyclobutane. Plasmas used to etch aluminum frequently include boron trichloride and/or chlorine, while ferric chloride plasmas are commonly used to etch stainless steel materials. Other compounds used in plasma etchants include but are not limited to argon, oxygen, and hydrogen.

As is well known in the art, the flow channel 36 (or 38) may alternatively be created by directly irradiating the substrate 70 through a chrome/quartz mask (with or without further intervening optics such as lenses) with ultraviolet radiation from a pulsed excimer laser.

It is to be understood, that the above examples of etchants and etching techniques are not intended to limit the scope of the methods that may be used, and that any etching technique that is suitable for a given material and application may be used according to the present invention.

The method of the present invention may additionally comprise the step of creating a conduit 50 that passes through the substrate 70. As was described earlier, when adapted to receive a cooling fluid, a conduit 50 may be used to cool the bipolar plate 10 of the present invention. Alternatively, when adapted to receive a heating fluid, a conduit 50 may be used to heat the bipolar plate 10 of the present invention. In certain embodiments, the step of creating the conduit 50 may be performed by etching. Additionally or alternatively, as illustrated in FIG. 12, in certain preferred embodiments, the step of creating the conduit 50 may be performed by etching complementary grooves 72 on the surface of two opposed substrates 70, and then bonding the surfaces in a subsequent step to form a tubular conduit 50. A range of metal, carbon and semiconductor bonding methods are known in the art, these include but are not limited to adhesive bonding, anodic bonding, eutectic bonding, fusion bonding, soldering, microwave bonding, and thermocompression. In certain other embodiments, the step of creating a conduit 50 may be performed by drilling, abrasive machining (i.e. sand blasting), laser machining, or laser ablation. It is to be understood that the internal inlet 58 (or 62) and internal outlet 60 (or 64) flow manifolds illustrated in FIG. 5 may be created by any of the methods described above for creating a conduit 50 of the present invention.

The method of the present invention may additionally comprise the step of coating the first face 14 (and/or second face 16) including the flow channel or channels 36 (or 38) and plateaus 40 (or 42) with a precious metal such as gold. As was mentioned earlier, the presence of an unreactive precious metal layer may prove advantageous in preventing the build up of an insulating oxide layer on the faces 14 and/or 16 of the bipolar plate 10. It will be appreciated that the coating of certain materials (e.g., silicon) with precious metals may be enhanced by coating the material with a seed or adhesive layer of a metal such as tantalum, chromium, or titanium. As is well known in the art, these coating steps may be performed using a variety of techniques that include, but are not limited to, sputter deposition, chemical vapor deposition, evaporation, electroplating, solution deposition, or combinations thereof.

The method of the present invention may additionally comprise the step of coating the flow channel 36 and/or conduit 50 with a reforming catalyst 15. As was described earlier, the presence of a reforming catalyst 15 in communication with fuel fluids within the flow channel 36 and/or conduit 50 may provide the bipolar plate 10 of the present invention with internal reforming capabilities. Alternatively, catalysts applied in related regions of flow channels or conduits can be used to react unreacted fuel prior to exhausting into the ambient. As is well known in the art, the coating step may be performed using a variety of techniques that include, but are not limited to, sputter deposition, chemical vapor deposition, evaporation, electroplating, solution deposition, or combinations thereof. The choice of method will be apparent to one of ordinary skill in the art, and will most likely depend on (a) the nature of the substrate 70, (b) the nature of the catalyst, (c) the dimensions of the flow channel 36 or conduit 50, (d) the physical properties of the deposited catalyst, and (e) the associated costs. It will be appreciated that the coating step may be integrated with the steps involved in creating the flow channel 36 or conduit 50. For example, a patterned hard mask 21 used to direct the etching process may advantageously be used to direct the selective coating of an etched flow channel 36 or conduit 50. It will also be appreciated that in certain embodiments a support layer (e.g., alumina, zirconia, silica, etc.) may be deposited within the channel 36 or conduit 50 prior to the coating step. As is well known in the art, the performance of certain catalysts is highly dependent on the chemical and/or physical characteristics of the support with which they are associated.

The method of the present invention may additionally comprise the step of creating a resistive element 56 that is located within the bulk of the substrate 70 or located on the surface of the substrate 70. As was described earlier, a resistive element 56 may be advantageously used to heat, and particularly to pre-heat, the bipolar plate 10 of the present invention. The resistive element 56 may be a thin film, a thick film, or a diffused resistor and may be created by any known processing technique. The step of creating a resistive element 56 may, for example, be performed by a combination of one or more of photolithography, wet etching, plasma etching, ion implantation, high temperature diffusion, boron concentration dependent etching, electrochemical etching, bonding, lift off, spin coating, dip coating, sputter deposition, evaporation, electroplating, solution deposition, and chemical vapor deposition.

The method of the present invention may additionally comprise the step of micromachining a sensor 17 from the bulk or surface of the substrate 70. As was described earlier, the presence of a sensor 17 associated with the bipolar plate 10 of the present invention would enable a range of physical and chemical parameters of the fuel cell stack 22 to be monitored. The monitoring of these parameters could in turn be used to control feedback mechanisms and hence would promote the stability of the fuel cell stack 22. Any bulk and/or surface micromachining technique known in the art may be used to construct a sensor 17 of the present invention. The step of micromachining a sensor 17 may, for example, be performed by a combination of one or more of photolithography, wet etching, plasma etching, boron concentration dependent etching, electrochemical etching, bonding, lift off, spin coating, dip coating, sputter deposition, evaporation, electroplating, solution deposition, and chemical vapor deposition.

Figure 13:
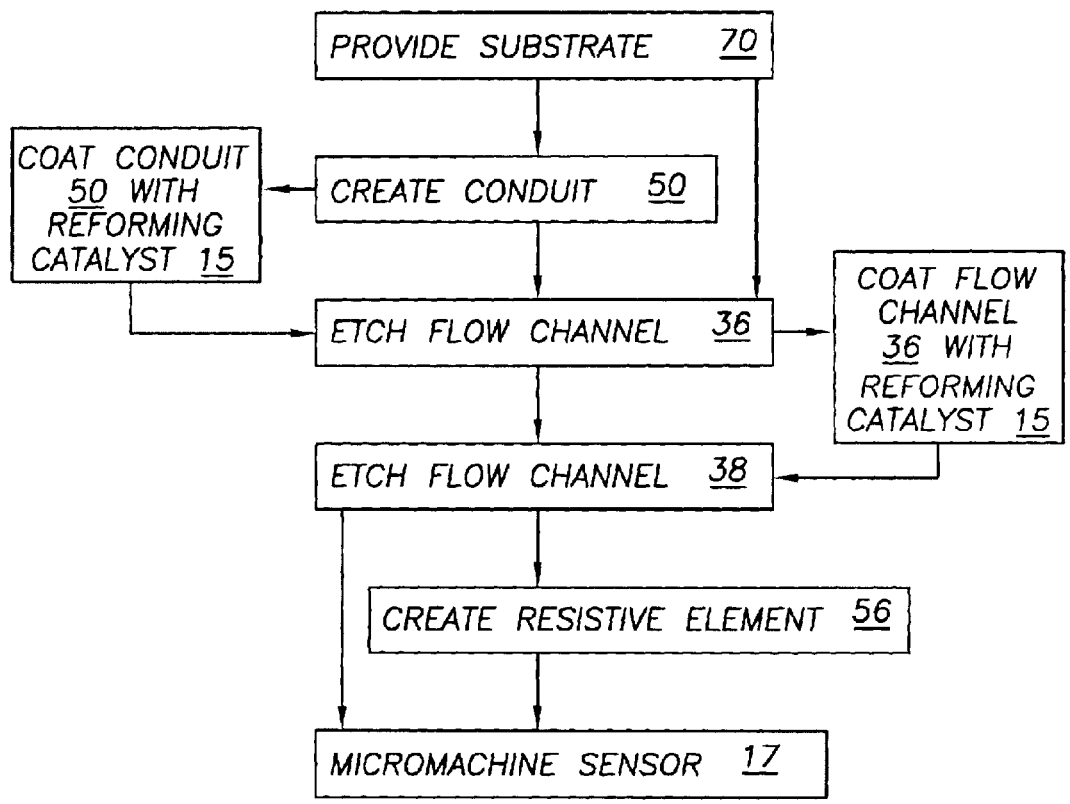
FIG. 13 is a flow chart depicting optional steps that may be included in the method of the present invention.

FIG. 13 depicts the various steps that may be included in making a bipolar plate 10 of the present invention.

It is to be understood that within the parameters discussed herein, the above description of an inventive bipolar plate 10 and the above description of an inventive method of making the bipolar plate 10 may also be applied to an end plate 111 (see FIG. 2) of the present invention. As is well known in the art, unlike bipolar plates 10 that are arranged between adjacent fuel cells within the body of the fuel cell stack 22, end plates 11 are located at the extremities of the fuel cell stack 22 and are therefore designed to contact either a fuel cell anode or a fuel cell cathode, but not both. As a consequence, it will be appreciated that unlike bipolar plates that preferably comprise flow channels on both faces of the plate, end plates comprise a substantially planar face 13 adapted to form a current collecting surface and contact a structural backing plate 66 (see FIG. 2), and a flow face 15 comprising flow channels adapted to confine either fuel or oxidizing fluids. It is to be understood that the backing plates 66 are preferably associated with further structural elements (not shown for simplicity) that maintain the stack 22 under pressure. It is also to be understood that the present invention encompasses methods of making any fuel cell stack 22 that include a step of incorporating a bipolar plate 10 of the present invention within a fuel cell stack 22.

It is yet further to be understood, that although in certain embodiments the bipolar plate 10 and end plate 11 are preferably adapted to provide a substantially semiconductive or conductive electrical contact between the neighboring fuel cells of a stack, in certain other embodiments the bipolar plate 10 and end plate 11 may be adapted to provide a substantially insulating electrical contact between the neighboring fuel cells of a stack. One could, for example, envisage a stack design wherein a group of fuel cells connected in series are arranged horizontally (i.e., side to side) instead of vertically (i.e., face to face as in FIG. 2). Such a horizontal stack could be completed with a first end plate arranged above the stack (adapted to contact and supply an oxidizing agent to the cathodes of the fuel cells) and a second end plate arranged below the stack (adapted to contact and supply fuel to the anodes of the fuel cells).

Some of the advantages of the present invention include, but are not limited to, the following:

The bipolar plates or end plates of the present invention may comprise semiconductive or conductive bodies, intricate features with close tolerances such as narrow flow channels and conduits with complex flow paths, integral resistive heating elements, internal catalytic reforming capability, waste fuel catalytic combuster, integral heat exchanging structure, substantially flat and undistorted contact faces, integral sensors, and internal recuperative heat exchanging capacity.

As a consequence of these optional features, when assembled within a fuel cell stack, the bipolar and end plates of the present invention may be used to perform a number of novel tasks that include monitoring and relaying information on a range of parameters within the fuel cell stack such as temperature, pressure, flow rate, chemical composition, voltage, etc., reforming fuel fluids within the flow channels or conduits, pre-heating the fuel cells via heating fluids, pre-heating the fuel cell stack via resistive heating elements, and cooling the fuel cells via cooling fluids.

The method of the present invention involves a range of integrated processing techniques (e.g., thin and thick film processing, etching, photolithography, micromachining, etc.) that enable a flexible approach to bipolar and end plate design. In addition, the ability to reliably produce features on a small scale allows for the potential miniaturization of bipolar plates and end plates and is therefore ideally suited to further the development of small scale (e.g., less than 200 W) portable fuel cell systems.

Other Embodiments

Other embodiments of the invention will be apparent to those skilled in the art from a consideration of the specification or practice of the invention disclosed herein. It is intended that the specification and examples provided herein be considered as exemplary only, with the true scope of the invention being indicated by the following claims.

I claim:

1. A bipolar plate for a fuel cell stack comprising:
   a body formed from a doped semi-conductive material having a first face adapted to contact an anode of a first fuel cell and a second face adapted to contact a cathode of a second fuel cell, the first face including a first flow channel adapted to confine fuel fluids, and the second face including a second flow channel adapted to confine oxidizing fluids.

2. The bipolar plate as defined in claim 1 wherein the bipolar plate has a thickness ranging from about 50 microns to about 2,000 microns.

3. The bipolar plate as defined in claim 1 wherein the bipolar plate has a thickness ranging from about 500 microns to about 1,000 microns.

4. The bipolar plate as defined in claim 1 wherein at least one of the flow channels has a width ranging from about 1 micron to about 5,000 microns.

5. The bipolar plate as defined in claim 1 wherein at least one of the flow channels has a width ranging from about 20 microns to about 500 microns.

6. The bipolar plate as defined in claim 1 wherein the semi-conductive material is selected from the group consisting of the Group IV semiconductors, the Group III–V semiconductors, and the Group II–VI semiconductors.

7. The bipolar plate as defined in claim 1 wherein the semi-conductive material is silicon.

8. The bipolar plate as defined in claim 1 wherein the first flow channel is further coated with a reforming catalyst or catalytic combuster.

9. The bipolar plate as defined in claim 8 wherein the reforming catalyst is selected from the group consisting of platinum, ruthenium, rhodium, nickel, cerium, iron, chromium, cobalt, manganese, copper, aluminum, oxides thereof, and mixtures thereof.

10. A bipolar plate for a fuel cell stack comprising:
a semi-conductive body having a first face adapted to contact an anode of a first fuel cell and a second face adapted to contact a cathode of a second fuel cell, the first face comprising a first flow channel adapted to confine fuel fluids, and the second face comprising a second flow channel adapted to confine oxidizing fluids;
wherein at least one of the flow channels has a depth ranging from about 1 micron to about 3,000 microns.

11. A bipolar plate for a fuel cell stack comprising:
a semi-conductive body having a first face adapted to contact an anode of a first fuel cell and a second face adapted to contact a cathode of a second fuel cell, the first face comprising a first flow channel adapted to confine fuel fluids, and the second face comprising a second flow channel adapted to confine oxidizing fluids;
wherein at least one of the flow channels has a depth ranging from about 5 microns to about 500 microns.

12. A bipolar plate for a fuel cell stack comprising:
a semi-conductive body having a first face adapted to contact an anode of a first fuel cell and a second face adapted to contact a cathode of a second fuel cell, the first face comprising a first flow channel adapted to confine fuel fluids, and the second face comprising a second flow channel adapted to confine oxidizing fluids; and
a conduit therethrough.

13. The bipolar plate as defined in claim 12 wherein the conduit is adapted to receive a cooling fluid or a heating fluid.

14. The bipolar plate as defined in claim 13, the bipolar plate further comprising a recuperative heat exchanger.

15. The bipolar plate as defined in claim 12 wherein the conduit is further coated with a reforming catalyst or catalytic combuster.

16. A bipolar plate for a fuel cell stack comprising:
a semi-conductive body having a first face adapted to contact an anode of a first fuel cell and a second face adapted to contact a cathode of a second fuel cell, the first face comprising a first flow channel adapted to confine fuel fluids, and the second face comprising a second flow channel adapted to confine oxidizing fluids; and
a resistive element located within the bulk of the bipolar plate or on the surface of the bipolar plate and adapted to heat the bipolar plate.

17. The bipolar plate as defined in claim 16 wherein the resistive element is selected from the group consisting of thin film resistive elements, thick film resistive elements, and diffused resistors.

18. The bipolar plate as defined in claim 16 wherein the resistive element comprises a material selected from the group consisting of doped silicon, nickel, chromium, tantalum, aluminum, molybdenum, tungsten, titanium, palladium, platinum, suicides thereof, oxides thereof, and mixtures thereof.

19. A bipolar plate for a fuel cell stack comprising:
a semi-conductive body having a first face adapted to contact an anode of a first fuel cell and a second face adapted to contact a cathode of a second fuel cell, the first face comprising a first flow channel adapted to confine fuel fluids, and the second face comprising a second flow channel adapted to confine oxidizing fluids; and
a sensor located within the bulk of the bipolar plate or on the surface of the bipolar plate.

20. The bipolar plate as defined in claim 19, wherein the sensor is selected from the group consisting of mechanical, thermal, magnetic, electrical, chemical, and radiation sensors.

21. The bipolar plate as defined in claim 20 wherein the chemical sensor is selected from the group consisting of hydrogen ion, hydrogen, oxygen, water, hydrogen peroxide, carbon monoxide, carbon dioxide, sulfur, sulfur oxide, methanol, ethanol, methane, ethane, butane, propane, and pentane sensors.

22. The bipolar plate as defined in claim 19 wherein the sensor is selected from the group consisting of pressure, temperature, voltage, and flow sensors.

23. A bipolar plate for a fuel cell stack comprising:
a conductive body having a first face adapted to contact an anode of a first fuel cell and a second face adapted to contact a cathode of a second fuel cell, the first face comprising a first flow channel adapted to confine fuel fluids, the second face comprising a second flow channel adapted to confine oxidizing fluids; and
a sensor located within the bulk of the bipolar plate or on the surface of the bipolar plate.

24. The bipolar plate as defined in claim 23 wherein the conductive body is selected from the group consisting of graphite, stainless steel, nickel, iron, chrome, tungsten, cobalt, titanium, and alloys thereof.

25. The bipolar plate as defined in claim 23 wherein the first flow channel is further coated with a reforming catalyst.

26. The bipolar plate as defined in claim 23, the bipolar plate further comprising a conduit therethrough.

27. The bipolar plate as defined in claim 26 wherein the conduit is adapted to receive a cooling fluid or a heating fluid.

28. The bipolar plate as defined in claim 26 wherein the conduit is further coated with a reforming catalyst or catalytic combuster.

29. The bipolar plate as defined in claim 23, the bipolar plate further comprising a resistive element located within the bulk of the bipolar plate or on the surface of the bipolar plate and adapted to heat the bipolar plate.

30. A bipolar plate for a fuel cell stack comprising:
a conductive body having a first face adapted to contact an anode of a first fuel cell and a second face adapted to contact a cathode of a second fuel cell, the first face comprising a first flow channel adapted to confine fuel fluids, the second face comprising a second flow channel adapted to confine oxidizing fluids, wherein the first flow channel is further coated with a reforming catalyst.

31. A bipolar plate for a fuel cell stack comprising:

a conductive body having a first face adapted to contact an anode of a first fuel cell and a second face adapted to contact a cathode of a second fuel cell, the first face comprising a first flow channel adapted to confine fuel fluids, the second face comprising a second flow channel adapted to confine oxidizing fluids; and a conduit therethrough adapted to receive cooling or heating fluid.

32. A bipolar plate for a fuel cell stack comprising:

a conductive body having a first face adapted to contact an anode of a first fuel cell and a second face adapted to contact a cathode of a second fuel cell, the first face comprising a first flow channel adapted to confine fuel fluids, the second face comprising a second flow channel adapted to confine oxidizing fluids; and a conduit therethrough coated with a reforming catalyst.

33. A bipolar plate for a fuel cell stack comprising:

a conductive body having a first face adapted to contact an anode of a first fuel cell and a second face adapted to contact a cathode of a second fuel cell, the first face comprising a first flow channel adapted to confine fuel fluids, the second face comprising a second flow channel adapted to confine oxidizing fluids; and a resistive element located within the bulk of the bipolar plate or on the surface of the bipolar plate and adapted to heat the bipolar plate.

34. An end plate for a fuel cell stack comprising:

a semi-conductive body having a first face adapted to collect current and a second face adapted to contact an electrode of the fuel cell, the first face having a substantially planar surface, and the second face comprising an etched flow channel adapted to confine fluids.

35. The end plate of claim 34, the end plate further comprising a sensor located within the bulk of the end plate or on the surface of the end plate.

36. The end plate of claim 34, the end plate further comprising a resistive element located within the bulk of the end plate or on the surface of the end plate and adapted to heat the end plate.

37. An end plate for a fuel cell stack comprising:

a conductive body having a first face adapted to collect current and a second face adapted to contact an electrode of the fuel cell, the first face having a substantially planar surface, and the second face comprising an etched flow channel adapted to confine fluids; and a sensor located within the bulk of the end plate or on the surface of the end plate.

38. The end plate of claim 37, the end plate further comprising a resistive element located within the bulk of the end plate or on the surface of the end plate and adapted to heat the end plate.

39. A fuel cell stack comprising:

a plurality of fuel cells, each fuel cell comprising a cathode, an anode, and an electrolyte arranged between the cathode and anode;

bipolar plates arranged between the fuel cells, each bipolar plate including a body formed from a doped semi-conductive material having a first face adapted to contact the anode of a fuel cell and a second face adapted to contact the cathode of a fuel cell, the first face including a first flow channel adapted to confine fuel fluids, and the second face including a second flow channel adapted to confine oxidizing fluids; and end plates, each end plate comprising a semi-conductive or conductive body having a first face adapted to collect current and a second face adapted to contact an electrode of a fuel cell, the first face having a substantially planar surface, and the second face comprising a flow channel adapted to confine fluids.

40. An electronic device comprising a fuel cell stack according to claim 39.

41. A bipolar plate for a fuel cell stack comprising:

a body formed from an undoped semi-conductive material with relatively high electrical conductivity at low temperatures, the body having a first face adapted to contact an anode of a first fuel cell and a second face adapted to contact a cathode of a second fuel cell, the first face including a first flow channel adapted to confine fuel fluids, and the second face including a second flow channel adapted to confine oxidizing fluids.

42. The bipolar plate as defined in claim 41 wherein the bipolar plate has a thickness ranging from about 50 microns to about 2,000 microns.

43. The bipolar plate as defined in claim 41 wherein at least one of the flow channels has a width ranging from about 1 micron to about 5,000 microns.

44. The bipolar plate as defined in claim wherein the semi-conductive material is selected from the group consisting of the Group IV semiconductors, the Group III–V semiconductors, and the Group II–VI semiconductors.

45. The bipolar plate as defined in claim 41 wherein the semi-conductive material is silicon.

46. The bipolar plate as defined in claim 41 wherein the first flow channel is further coated with a reforming catalyst or catalytic combuster.

* * * * *